Nov. 18, 1958 G. SAJECK 2,860,631
GAS DEMAND EQUIPMENT
Filed July 11, 1956 2 Sheets-Sheet 1
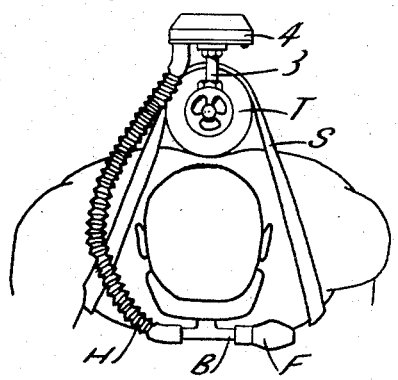
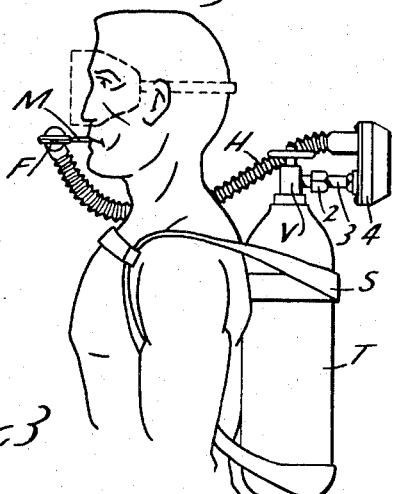
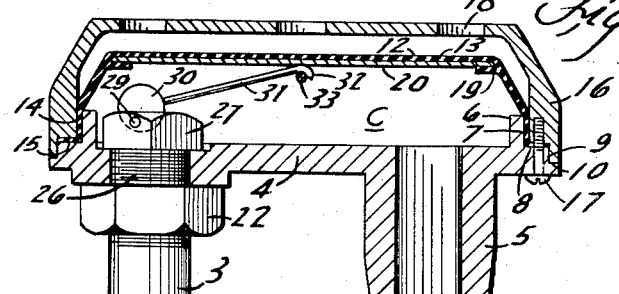
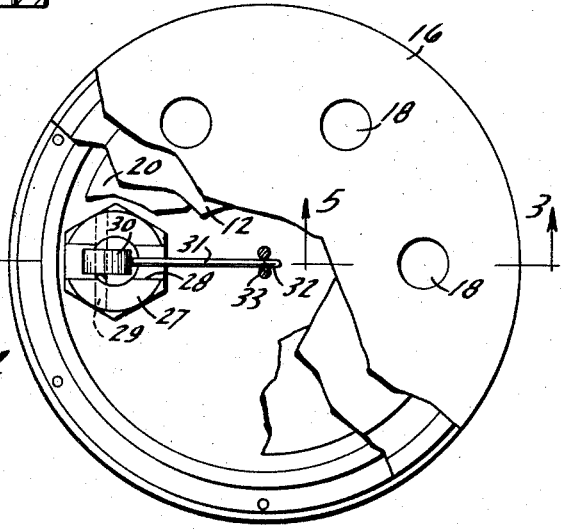
INVENTOR.
George Sajeck
BY
Louis O. French
Att'y.

Nov. 18, 1958  G. SAJECK  2,860,631
GAS DEMAND EQUIPMENT
Filed July 11, 1956  2 Sheets-Sheet 2
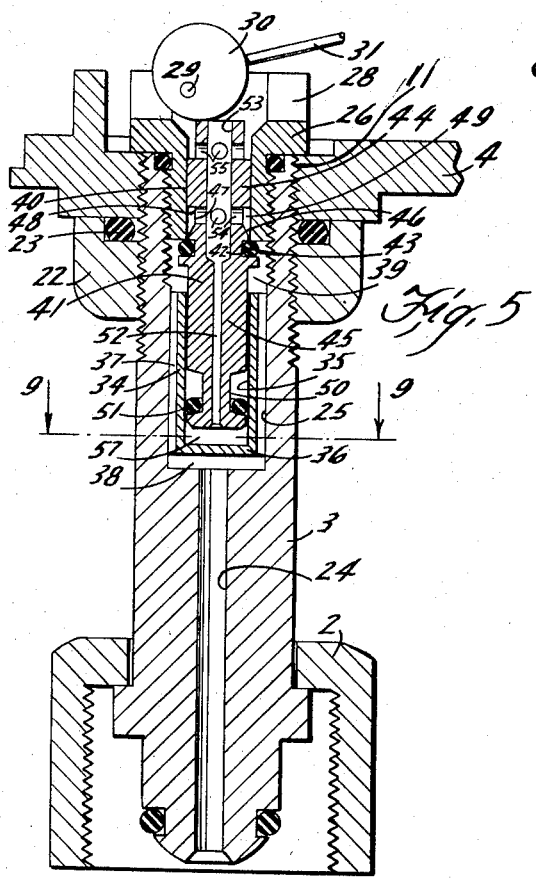
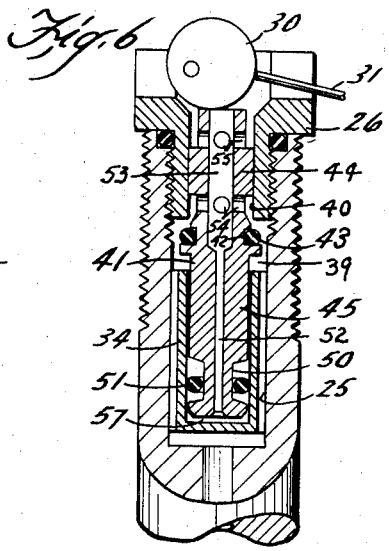
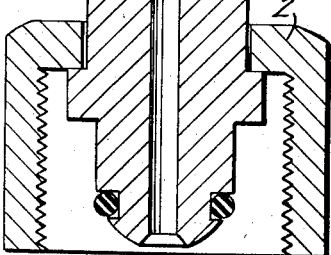
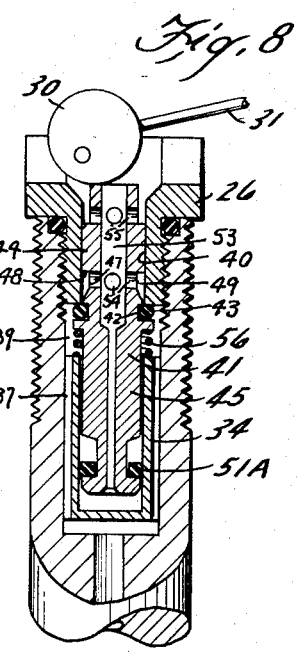
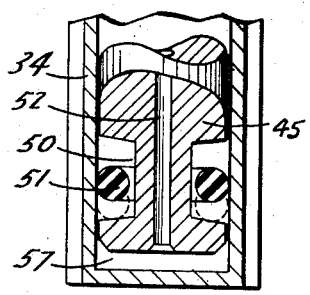
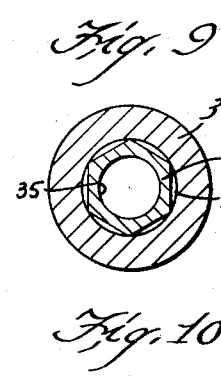
INVENTOR.
George Sajeck
BY
Louis O. French
Atty.

United States Patent Office 2,860,631
Patented Nov. 18, 1958

2,860,631

GAS DEMAND EQUIPMENT

George Sajeck, Milwaukee, Wis.

Application July 11, 1956, Serial No. 597,236

3 Claims. (Cl. 128—142)

The invention relates to gas demand equipment.

One object of the invention is to provide a new and improved valve mechanism to release high pressure air or gas, for example 2600 p. s. i., from a container or high pressure cylinder requiring only a slight pressure, for example one-quarter ounce or less, to release such air or gas in quantities needed for breathing as in diving equipment, in a smoke-filled room, mine filled with noxious gases, or to supply oxygen to aviators or patients needing oxygen or other gases. Usually devices of this kind require a much greater force exerted by compounded leverage systems to open the valve controlling the high pressure gas, or the high pressure is first cut down to about 95 p. s. i. by a conventional pressure regulator before entering the demand regulator.

A further object of this invention is to provide a gas controlling valve which is so formed and constructed that it acts automatically as a pressure reducing device for the gas supplied by the container and obviating the use of a separate pressure regulator.

The invention further consists in the several features hereinafter described and more particularly defined by claims at the conclusion hereof.

In the drawings:

Fig. 1 is a top plan view of equipment in which the valve mechanism embodying the invention may be used;

Fig. 2 is a side elevation view of this equipment in its applied position;

Fig. 3 is a vertical sectional view through the air demand unit of the equipment taken on the line 3—3 of Fig. 4;

Fig. 4 is a front elevation view of the air demand unit, parts being broken away;

Fig. 5 is an enlarged vertical sectional view through the gas control valve mechanism embodying the invention in its closed position;

Fig. 6 is a view similar to Fig. 5 showing the control valve mechanism in an open position, parts being broken away;

Fig. 7 is an enlarged vertical sectional view of parts shown in Fig. 6;

Fig. 8 is a view similar to Fig. 5 showing certain modifications, parts being broken away;

Fig. 9 is a detailed horizontal sectional view taken on the line 9—9 of Fig. 5;

Fig. 10 is a view similar to Fig. 9 showing certain modifications.

The valve mechanism hereinafter described is operable in conjunction with any suitable source of opposing fluid pressure such as water, air, or other gas and by way of example has been shown as used in air demand equipment used by divers in under-water work.

Referring to the drawings, the letter T designates a tank containing compressed air or other breathable gas and having the usual shut off valve V mounted thereon, said tank being hung from the diver in any suitable manner as by shoulder straps S. As shown, the outlet of the valve V is connected by a union coupling 2 with a pipe 3 that extends forwardly from a base member 4 forming the back end of the unit. A hose boss 5 also extends forwardly from the base member 4.

The base member 4 of metal or suitable plastic has a laterally projecting annular ring portion 6 on its front side providing shoulders 7 and 8 and having a peripheral recess providing shoulders 9 and 10. It also has a threaded opening 11 diametrically opposite the boss 5.

A diaphragm 12 of soft rubber or other suitable waterproof material is formed in the shape of a conically sided cup with a flat bottom 13 and annular side portions 14 that connect with an annular flange 15. The diaphragm 12 is held in fluid-tight relation with the base member by a flanged cylindrical cover 16, the bottom edge of the flange being of stepped formation to provide shoulders that abut the shoulders 9 and 10, and a shoulder acting in conjunction with the shoulder 8 to clamp the flange 15 of the diaphragm between them, the sides of the cover also closely disposed relative to the side portions 14 of the diaphragm to act in conjunction with the shoulder 7 to reinforce the diaphragm adjacent its point of anchorage. Screws 17 clamp and secure the cover and diaphragm to the base member. The cover has a series of openings 18 to permit the surrounding fluid media to act on the diaphragm.

The bottom of the diaphragm acts in conjunction with an annular inwardly extending integral flange 19 to hold a reinforcing plate 20 of metal or other suitable stiff material to the bottom of the diaphragm. A flexible breathing hose H of rubber or other suitable material is adapted to be forced over the boss 5 to connect the chamber C with the usual mouthpiece M. A flexible rubber flap valve F of known construction connects by a branch B with the mouthpiece and acts as an exhalation valve. Other forms of exhalation valves and connections for this valve may be used, if desired. Since the boss 5 is diametrically disposed relative to the air inlet conduit 3 and both project from the back of the base member 4, the connection to said base member can be readily made and the air hose H can come straight out from the unit and extend forward along one side of the diver's head or neck to his mouth as shown in Figs. 1 and 2 so that the diver's head movements are not interfered with or restricted.

The pipe or conduit 3 is threaded at one end to engage the threaded opening 11 and the threads of a clamping nut 22 which acts to clamp a flexible sealing gasket 23 for the joint between said pipe and the base member. The pipe 3 has centrally disposed concentric communicating bores 24 and 25, the upper end of bore 25 being threaded to receive a tubular seat member 26 which has hexagonal head 27, slotted at 28 and carrying a transverse pin 29 upon which an eccentric or cam member 30 is pivotally mounted. Cam 30 has a lever arm 31 connected at one end thereto, the other end 32 being of hooked form engaging in an eye member 33 secured to the central part of the metal plate 20 so that the lever 31 and consequently the cam 30 follows the in and out movements of the diaphragm 12 and plate 20 under the action of water pressure and air pressure acting on the diaphragm so that a positive operating connection is provided between the diaphragm and the valve hereinafter described, it being noted that other forms of connection between the diaphragm and the valve may be used, if desired, without departing from the invention.

The lower end of the bore 25 has a cup member 34 in a pressed fit engagement therewith to provide a bore 35 closed at its lower end 36 and passages 37 connecting the space 38 below this member with a chamber 39 formed between its upper end and the seat member 26. As shown in Fig. 9, the outer surface of the member 34 is hexagonal to provide the passages 37. As shown in Fig. 10, this outer surface may be a cylinder provided with lengthwise extending radially disposed grooves 37A to form similar passages. The diameter of the bore 35 is slightly smaller than that of the seat bore 40. The passages 37 and 37A may provide a restricted communication with the tank T. By the term "slightly smaller" I mean that this diameter may be from .003" to .010", preferably .003" to .005", smaller than that of the bore 40.

The gas control valve 41 is a cylindrical member formed with an annular groove 42 to receive an O-ring 43 of rubber or other suitable yieldable material to engage the seat member 26 at the bore 40 and having piston extensions 44 and 45, and an inclined or tapered surface 46 beyond the seat extending to a cylindrical surface 47 of reduced diameter which connects with an annular shoulder 48 at the back of the piston 44. The surfaces 46, 47, and 48 provide a chamber 49 that may be termed a pressure reducing chamber. The piston extension 44 has an elongated annular groove 50. A sealing member in Figs. 5 to 7, an O-ring 51 of rubber or other suitable yieldable material, and in Fig. 8 a rectangular ring 51A of similar material is mounted in the groove 50 so that its inner diameter is free at all times from the base of the groove 50 and its outer diameter is yieldably engageable with the bore 35, being, in accordance with known practice, of somewhat larger diameter for this purpose, the groove 50 as shown in Figs. 6, 7 and 8 being of a length so that the rings 51 or 51A are free of the valve as soon as the valve opens. The valve has a through bore formed by a smaller bore 52 and a larger bore 53 though these may be of the same diameter, if desired. The chamber 49 connects with the bore 53 through one or more radially disposed orifices 54 of predetermined size. Radially disposed passages 55 connect the bore 53 with the upper end of the bore 40 and extend from the bore 53 to communicate with the slot 28. While not essential to the working of the device, a light spring 56, as shown in Fig. 8, may be interposed between the valve and member 34 to overcome the friction between the parts so that normally the valve under the forces hereinafter described will be biased to a closed position. The pistons 44 and 45 have the usual working or clearance fits in their bores, that for the piston 45 being exaggerated here to indicate that some gas may pass from the chamber 39 along this piston into the space formed by the groove 50 in back of the ring 51 or 51A.

With the parts shown in Figs. 5 and 8, the high pressure gas from the container T passes therefrom through the bore 24, the passages 37 or 37A to the chamber 39, and some of this gas escapes along the piston 45 and enters the chamber formed by the groove 50 and acts on the ring 51 or 51A to press this ring against the bore 35 and also against the lower shoulder of said groove, thus sealing this piston against the escape of the gas which then acts on an area equal to the diameter of the bore 35. This gas also acts on the area defined by the seating area of the ring 43 which has substantially a line contact with the bore 40 as this seating area is along the ring diameter and the pressure in chamber 39 is acting on the outer half of said ring. The outside radius of this seating area, as previously noted, is from .003" to .010" larger than the bore 35 so that there is a differential pressure acting on the head end of the inlet valve 43 tending to close this valve, but this differential has been found to be so small that very little effort, for example, a force of about one-quarter ounce is necessary to be applied to the valve through the diaphragm 12, lever 31, and cam 30 to the upper end of the valve 30 to open the valve.

As in all devices of this kind, the water pressure acting on the outer surface of the diaphragm 12 is opposed by the air pressure from the supply tank introduced into the chamber C past the valve 41. As the air in the chamber C is used up by the diver, the pressure in this chamber is decreased so that the water pressure acting on the outside of the diaphragm acts to move it inwardly, thus swinging the lever inwardly and turning the cam 30 so as to move the valve 41 off its seat at the inner end of the bore 40 to admit more air into the chamber C and equalize the pressure therein with the pressure of the surrounding water media. Thus the valve 41 is opened and closed in accordance with the diver's requirements, and the valve operating mechanism follows the movements of the diaphragm under the action of the forces acting on the opposite sides thereof.

The opening of the valve is made easier because while the pressure of the air from chamber 39 is acting on the ring 51, 51A to hold it in a sealed position relative to the bore 35, the ring 51 or 51A being at all times free of the bottom of the groove does not resist the opening of the valve 41 but stays in position as the valve is opened as shown in Fig. 7 in connection with the ring 51. With the valve 41 open, if some of the air from chamber 34 passes into the recess, forming the groove 50, around the inner side of the ring 51, then this air can leak by the outer end of the piston 44 into the space 57 and be vented through the through passages 52 and 53 in the valve to the chamber C, the pressure of this air being reduced because of the restrictions through which it has to pass. This vented air on entering the space 57 exerts an upward pressure on the bottom of the piston 45 in a direction acting to close the valve 41.

The opening of the valve 41 through the port formed between the tapered surface 49 and the bore 40 establishes a variable throttling restriction between the chamber 39 and the chamber 49 which has the effect of reducing the pressure of the air going to the chamber C. The fixed predetermined diameter orifices 47 also act to reduce the pressure of the air passing to the chamber C via the bore 53 and the passages 55 so that it has been found that a separate pressure regulator in the air pressure supply line is not necessary.

The tapered passage to the chamber 49 also acts to increase the velocity of the air passing into this chamber, which air acting against the shoulder 48 has a constant tendency to move the open valve to a closed position so that when the diaphragm 12 moves outwardly and pressure of the cam 30 on the valve is released, the valve 41 will be automatically closed.

Because of the differential pressure acting on the ring 43 to seal the valve is very small, there is no danger of fracturing this ring or causing its extrusion into the bore 40 so that the ring will have a long life. The application of the force in the opposite direction against the sealing ring 51 or 51A, as previously noted, relieves pressure on the ring 43 and at the same time it permits the piston 45 to slide freely in the direction of the air pressure. Also this ring 51 or 51A does not interfere with the closing of the valve as above described.

By selecting the proper diameters for the bores 35 and 40 the mechanism can be regulated to release a metered amount of air through the holes 54 from the chamber 49, it being noted that the tapered sides 46 of the valve also provide a variable metering orifice.

As previously noted, the mechanism above described may be used in other forms of air demand equipment where air or gas pressure instead of water may act on the exposed face of the diaphragm 12.

I desire it to be understood that this invention is not to be limited to any particular form or arrangement of parts except in so far as such limitations are included in the claims.

What I claim as my invention is:

1. In gas demand equipment, the combination of a housing, a supply of gas under pressure, valve mechanism for controlling the passage of said pressure gas to said housing comprising a conduit connecting said supply with said housing, said conduit having a valve seat therein, a bore in said housing spaced from said seat and concentric therewith, a chamber formed between said bore and said seat, the cross-sectional area of said bore being slightly less than the area enclosed by said valve seat, a valve member having a seat contacting portion disposed in said chamber and having a piston extension working in said bore, sealing means for said piston extension operative when said valve is closed and completely free of the valve on its opening movement, means for exposing the outer end of said piston extension to gas pressure within said housing, the gas from said supply acting upon the differential area between said valve seat and bore to normally urge the valve to a closed position, and fluid pressure operated means connected to said valve member acting in response to a gas demand to move said valve member to open position.

2. Gas demand equipment as defined in claim 1, wherein the sealing means for said piston is a sealing ring of yieldable material mounted in an elongated annular groove of said piston and yieldingly engageable with said bore but free at all times from the bottom of said groove, said ring in the closed position of the valve member adapted to engage one end of said groove and in all other positions of said valve being completely free of the valve and yieldably held in a fixed position in said bore by its frictional engagement therewith.

3. In gas demand equipment, the combination of a housing, a supply of gas under pressure, valve mechanism for controlling the passage of said pressure gas to said housing comprising a conduit connecting said supply with said housing, said conduit having an outlet passage portion providing a valve seat at its inner end, a valve member adapted to engage said valve seat and having piston portion extending into said outlet passage portion provided with an annular groove adjacent said valve seat and forming with said passage a pressure reduction chamber, said groove having a tapered side cooperating with said valve seat to form a variable throttling inlet to said chamber, the piston portion beyond said groove having a working fit in said chamber, orifice means of predetermined size leading from said chamber, conduit means in said piston portion connecting said orifice means with the interior of said housing, and fluid pressure operated means operatively connected to said valve member and acting in response to a gas demand to move said valve member to open position.

References Cited in the file of this patent

UNITED STATES PATENTS

| | | |
|---|---|---|
| 708,108 | Weiseckel | Sept. 2, 1902 |
| 914,547 | Bech | Mar. 9, 1909 |
| 2,314,683 | Berry | Mar. 23, 1943 |
| 2,692,114 | Fullwood | Oct. 19, 1954 |
| 2,731,033 | Cable | Jan. 17, 1956 |
| 2,731,975 | Boals | Jan. 24, 1956 |

FOREIGN PATENTS

| | | |
|---|---|---|
| 1,048,267 | France | Apr. 5, 1951 |
| 891,498 | Germany | Sept. 28, 1953 |